United States Patent
Hillig

[19]

[11] 3,956,564
[45] May 11, 1976

[54] GRADED FILAMENTARY COMPOSITE ARTICLE AND METHOD OF MAKING

[75] Inventor: William B. Hillig, Ballston Lake, N.Y.

[73] Assignee: General Electric Company, Schenectady, N.Y.

[22] Filed: July 28, 1975

[21] Appl. No.: 599,886

Related U.S. Application Data

[63] Continuation-in-part of Ser. No. 382,487, July 25, 1973, abandoned.

[52] U.S. Cl. .............................. 428/366; 428/364; 428/367; 428/368; 428/375; 428/378; 428/379; 428/392; 428/394
[51] Int. Cl.² ...................... B32B 9/00; D02G 3/00
[58] Field of Search ........... 428/364, 366, 367, 368, 428/375, 378, 379, 392, 394, 395; 156/242, 157, 158; 57/159; 416/230; 264/1, 161, 163, 172, 174

[56] References Cited
UNITED STATES PATENTS

| 3,237,697 | 3/1966 | Ford et al. .................. 416/230 X |
| 3,664,764 | 5/1972 | Davies et al. .................. 416/230 X |
| 3,679,324 | 7/1972 | Stargardter .................. 416/230 X |
| 3,724,645 | 4/1973 | Spaar .......................... 156/157 X |
| 3,778,334 | 12/1973 | Sturgeen ........................ 428/285 |

Primary Examiner—Lorraine T. Kendell
Attorney, Agent, or Firm—William A. Teoli; Joseph T. Cohen; Jerome C. Squillaro

[57] ABSTRACT

A graded filamentary composite article comprises a plurality of densely packed unidirectional elongated high strength reinforcing filamentary material with varying lengths, a second plurality of densely packed unidirectional elongated different filamentary material of varying lengths, such as fibers of boron, carbon, glass and steel, etc., both pluralities of elongated filamentary materials arranged in the same direction and of similar cross-sectional area and with the ends of the varying lengths of opposite filamentary pluralities interleaved with one another, and a thermosetting resin holding the filamentary material in parallel relationship.

3 Claims, 4 Drawing Figures

GRADED FILAMENTARY COMPOSITE ARTICLE AND METHOD OF MAKING

This application is a continuation-in-part of copending application Ser. No. 382,487 filed July 25, 1973, and now abandoned and assigned to the same assignee as the present invention. This invention relates to a filamentary composite article and to a method of making such an article and, more particularly, to such an article wherein a graded filamentary structure is employed and to a method of making such an article.

Composite articles are useful in many applications. Composite articles are prepared generally by mixing together 50–70 weight percent of the fibers with 50–30 weight percent conventional polymer binders as the matrix material. Such structures are then prepared in a conventional manner by a heat, vacuum, pressure molding cycle resulting in composites which are lightweight but exhibit excellent flexural strength.

While high strength reinforcing filamentary composite articles or materials would be desirable for various applications, severe but differing mechanical demands are made upon such structures that vary with position within those structures. For example, aircraft engine fan blades must be stiff, strong and lightweight over the air-surface but they also require good impact resistance. Impact strength and toughness should increase as the root section of the blade is approached so that shank failure can be avoided. Thus, some applications require ductility over certain areas and extreme strength over other areas which characteristics are incompatible with one another.

In the prior art, various approaches have been taken to produce composite articles which will exhibit good impact strength and toughness. For example, the use of interleafing of fiber glass cloth, metal foil, two-dimension boron sheet and wire screens have been introduced into composites to distribute stress. Other approaches have been employed wherein some fibers within the composite are arranged in one direction and another group of fibers are arranged in a perpendicular or other discrete direction. Abutting joints have also been employed including standard joints such as butt joints, scarf joints, etc. Further, in order to make high strength composite articles a core of one composite system has been employed with an outer layer of another composite system.

As opposed to the above prior art approaches my present invention is directed to a graded filamentary composite article and to a method of making such an article which eliminates the above problems.

The primary objects of my invention are to provide a graded filamentary composite article which has local adjustment of material properties therein by locally varying the reinforcing filament materials within the composite structure.

In accordance with the present invention there is provided a graded filamentary elongated composite article having a substantially uniform cross-sectional area over its entire length comprising a plurality of densely packed unidirectional elongated high strength reinforcing filamentary material with varying lengths, a second plurality of different densely packed unidirectional elongated high strength reinforcing filamentary material of varying lengths, both pluralities of elongated high strength reinforcing filamentary materials arranged in the same direction and of similar cross-sectional area with ends of the varying lengths of opposite high strength reinforcing filamentary pluralities in contact and substantially free of overlap with respect to each other, and a thermosetting binder holding the high strength reinforcing filamentary materials in parallel relationship.

These and various other objects, features and advantages of the invention will be better understood from the following description taken in connection with the accompanying drawing in which.

Figure 1:
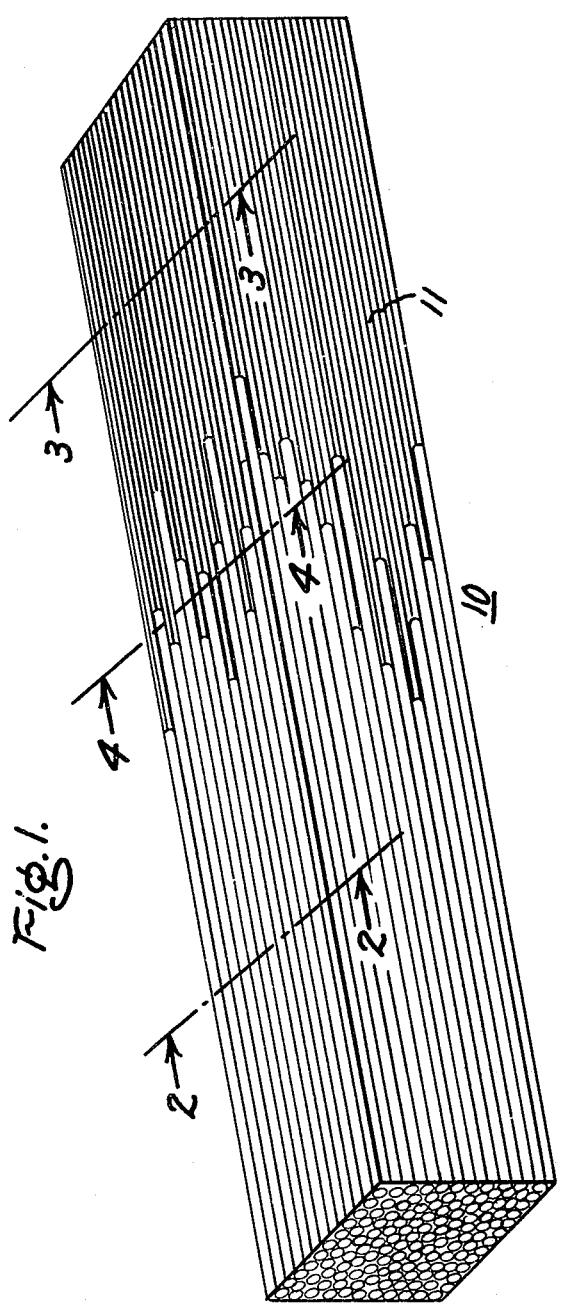
FIG. 1 is a perspective view of a graded filamentary composite article made in accordance with the method of my invention.

In FIG. 1 of the drawing there is shown generally at 10 a graded filamentary composite article made in accordance with my method which article is in the form of a bar 11.

Figure 2:
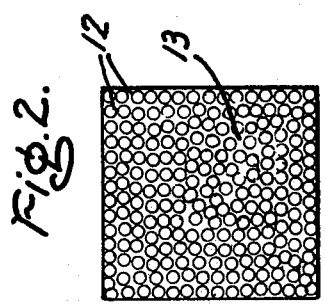
FIG. 2 is a sectional view taken on line 2—2 of FIG. 1.

In FIG. 2 of the drawing there is shown a sectional view taken on line 2—2 of FIG. 1 showing a first plurality of densely packed elongated filamentary material 12 such as 3 mil stainless steel wire. Wires 12 are unidirectional and have varying lengths. An epoxy resin binder 13 is shown holding filamentary material 12 in a densely packed, generally parallel relationship.

Figure 3:
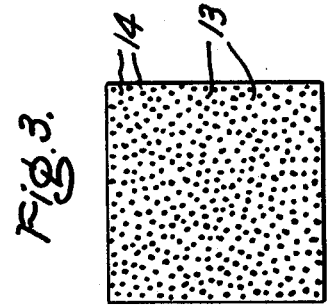
FIG. 3 is a sectional view taken on line 3—3 of FIG. 1.

In FIG. 3 of the drawing, there is shown a sectional view taken on line 3—3 of FIG. 1 showing a second plurality of densely packed elongated filamentary material 14 such as carbon fibers. Epoxy resin binder 13 is shown holding filamentary material 14 in a densely packed, generally parallel relationship.

Figure 4:
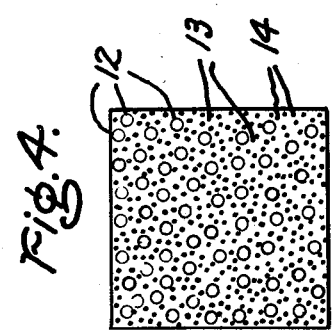
FIG. 4 is a sectional view taken on line 4—4 of FIG. 1.

In FIG. 4 of the drawing, there is shown a sectional view taken on line 4—4 of FIG. 1 showing the ends of varying lengths of both the first and second pluralities of filamentary materials 12 and 14 interleaving with one another. A thermosetting resin such as an epoxy resin binder 13 is shown holding filamentary materials 12′ and 14 in a densely packed, generally parallel relationship. As shown in FIGS. 1–4, both pluralities of filamentary material are unidirectional and of similar cross-sectional area.

I found that I could make a graded filamentary composite article which would exhibit various material properties locally within the structure by locally varying the reinforcing filamentary materials within the composite article. The composite article has quite different properties along its length with no apparent penalty in property attributable to the grade. There are no distinct planes of discontinuity leading to stress concentrations, which in turn lead to premature failures, initiating at such discontinuities.

I found that a wide variety of filamentary materials can be employed for the first and second elongated materials within the composite article. For example, I have been able to make graded filamentary composite articles in accordance with my method employing 3 mil stainless steel wires as the first plurality of densely packed elongated filamentary material and employing carbon fibers as the second plurality of densely packed elongated filamentary material. Other pluralities of elongated filamentary material which can be used are filaments derived from 3 mil piano wire, 3 mil high tensile steel wire, boron, polybenzimadazoles, silicon carbide, 100% glass, carbon coated silicon dioxide, etc.

I found that carbon fibers or filaments, which include both carbon or graphite filamentary material or a mixture of both, can be used in the form of tows in which each tow has numerous individual elongated carbon fibers. For example, tows of 10,000 elongated carbon filaments are commerically available under the name of Morganite I and II which are produced by the Whittaker Corporation, Narmco Division, 600 Victoria Street, Costa Mesa, California. Additionally, such elongated carbon filaments are available in tows containing about 1,000 elongated carbon filaments WYK braids which are available commercially from the Union Carbide Company, New York, New York.

I found that I can form a graded filamentary article from two different pluralities of elongated filamentary materials. In a preferred method, I build up a first plurality of elongated filamentary material with varying lengths. The lengths of the filaments or tows of filaments are staggered over a desired transition length. Thus, the number of filaments in a cross-section along the length is gradually decreasing. A second plurality of different elongated filamentary material with varying lengths are mated unidirectionally during the build-up or lay-up with the first plurality of filamentary material. The cross-sections of both pluralities of materials remain constant through the entire length of the build-up of filamentary materials. A binder is applied to the materials to produce an elongated composite mass after which the mass is compressed to pack densely the filamentary materials. The binder is cured to produce a graded filamentary composite article.

Examples of graded filamentary composite articles made in accordance with my method are as follows:

EXAMPLE 1

A graded filamentary composite article was formed as described above and as shown in FIGS. 1–4 of the drawing. A first plurality of elongated filamentary material of carbon filaments with varying lengths was built up unidirectionally. The carbon filaments were in the form of filamentary tows each containing 10,000 elongated carbon filaments. A second plurality of filamentary material was built up whereby the cross-sectional area of both pluralities were the same throughout the entire length. The ends of the varying lengths of opposite filamentary pluralities interleaved with one another. A binder of Epon epoxy E-293 was applied to a built-up composite of both types of materials. The epoxy is manufactured by the Shell Chemical Company, New York, New York. The application of the binder produces an elongated composite mass which was compressed to pack densely the filamentary materials therein. The binder was allowed to cure completely overnight at room temperature thereby resulting in a graded filamentary composite article having dimensions of 1 × 1 ½ × 12 inches.

EXAMPLES II–V

In these Examples graded filamentary composite articles were formed in accordance with my method and as described generally above in Example I. The same second plurality of elongated filamentary material of tows of carbon filaments were employed. However, the first plurality of elongated filamentary material was 3 mil stainless steel wire in Example II, 3 mil piano wire in Example III, 3 mil high tensile steel wire in Example IV and carbon coated silicon dioxide in Example V. Each resulting structure from Examples II–V was a graded filamentary compoiste article.

EXAMPLE VI

The graded filamentary composite article made in accordance with Example II was tested which results are shown below in Table I.

TABLE I

| Fiber Composition | 100% Steel | Grade Region 50% Steel 50% Carbon | 100% Carbon |
|---|---|---|---|
| Tensile (KSI) | 325 | 140 | 190 |
| Charpy Impact (ft lbs) | >60 | 27 | 32 |

While other modifications of the invention and variations thereof which may be employed within the scope of the invention have not been described, the invention is intended to include such as may be embraced within the following claims:

What I claim as new and desire to secure by Letters Patent of the United States is:

1. A graded filamentary elongated composite article having a substantially uniform cross-sectional area over its entire length comprising a plurality of densely packed unidirectional elongated high strength reinforcing filamentary material with varying lengths selected from the group consisting of polybenzimadazoles fibers, steel fibers, boron fibers, silicon carbide, fibers, carbon fibers, and carbon coated silicon dioxide fibers, a second plurality of different densely packed unidirectional elongated high strength reinforcing filamentary material of varying lengths selected from the group consisting of polybenzimadazoles fibers, steel fibers, boron fibers, silicon carbide, fibers, carbon fibers, and carbon coated silicon dioxide fibers, both pluralities of elongated high strength reinforcing filamentary materials arranged in the same direction and of similar cross-sectional area with ends of the varying lengths of opposite high strength reinforcing filamentary pluralities in contact and substantially free of overlap with respect to each other, and a thermosetting binder holding the high strength reinforcing filamentary materials in parallel relationship.

2. A graded filamentary composite article in accordance with claim 1, where the densely packed unidirectional elongated high strength reinforcing filamentary material is selected from the class consisting of carbon fibers, glass fibers, and steel fibers.

3. A graded filamentary composite article in accordance with claim 1, where the thermosetting binder is an epoxy resin.

* * * * *